Fig. 1

INVENTORS
JAMES E. HARRIS
MARSHALL D. McSHURLEY
DONALD G. MAHONEY
BY Willits Hardman
THEIR ATTORNEYS

Nov. 2, 1954        J. E. HARRIS ET AL        2,693,012
METHOD AND APPARATUS FOR MANUFACTURING SHEET MATERIAL
Filed Sept. 8, 1950        9 Sheets-Sheet 8

CROSS SECTION OF .070 SHEET
MAGNIFIED ABOUT 75 DIAMETERS

Fig.14

INVENTORS
JAMES E. HARRIS
MARSHALL D. McSHURLEY
DONALD G. MAHONEY
BY
THEIR ATTORNEYS

United States Patent Office 2,693,012
Patented Nov. 2, 1954

2,693,012

METHOD AND APPARATUS FOR MANUFACTURING SHEET MATERIAL

James E. Harris, Eaton, Marshall D. McShurley, Daleville, and Donald G. Mahoney, Muncie, Ind., assignors to General Motors Corporation, Detroit, Mich., a corporation of Delaware Application September 8, 1950, Serial No. 183,708

4 Claims. (Cl. 22—57.5)

This invention relates to an apparatus and method for fabricating sheet stock directly from molten metal and is particularly directed to an apparatus and method for making lead or lead alloy sheet directly from metal in the molten state.

It is, therefore, the basic object of the invention to provide a method and apparatus wherein molten metal, of the desired constituency and at a controlled temperature, is fed in predetermined quantities continuously toward the bight of a pair of vertically disposed rolls which are spaced apart at a distance equivalent to the desired thickness of the sheet to be formed.

In carrying out the above object, it is a further object of the invention to provide a method and apparatus for forming sheet stock directly from metal in the molten state wherein a pair of cooled rolls are utilized, which rolls are disposed generally one above the other having their axes in a common plane which is disposed at an angle of about 30° from the vertical. This disposition of the rolls permits utilization of a smaller pool of molten metal at the bight of the rolls which reduces power consumption, cooling problems and in general provides a more uniform sheet of metal stock to be formed by the rolls.

In carrying out the above object it is a further object of the invention to limit the depth of the pool of metal at the bight of the rolls so that the upper level of said pool is always below the axis of the upper roll. In the preferred form, the depth of the pool is not less than five times the thickness of the sheet to be formed nor more than 15 times its thickness, when measured on a line parallel to the vertical axis of the lower roll.

A still further object of the invention is to provide a method and apparatus for forming sheet stock directly from molten metal wherein molten metal is cooled on the surface of one roll to form a retaining skin of metal adjacent the roll and to create a substantially plastic condition in the major portion of the remaining metal prior to the time that said metal contacts the other roll, whereby the plastic metal is mechanically worked and is finally frozen completely immediately before the instant that the sheet metal passes through the bight of the rolls Another object of the invention is to provide an apparatus for continuously feeding molten metal to the rolls, said apparatus being in the form of a ladle which acts as a scavenging means for removing any scum or slag which floats on the metal whereby a uniform layer of clean molten metal is supplied to the rolls. This ladle is movable into and out of position for feeding and includes safety features in the construction thereof which prevents the accidental spilling of metal from the ladle. These safety means also prevent movement of the ladle except under conditions predetermined by operation of the safety devices.

In carrying out the above object, another object of the invention is to provide a locking device for the ladle which prevents backward movement of the ladle until such time as the rear end of the ladle has been lowered to stop the flow of molten metal from the mouth thereof.

A further object of the invention is to provide a pair of rolls which, due to the constructional characteristics therein, are uniformly cooled by means of water which is channeled through the rolls so that all portions of the rolls are maintained at a substantially uniform temperature.

A still further object of the invention is to provide a method for fabricating sheet lead or lead alloy directly from lead or lead alloy in the molten state wherein the sheet formed is cooled at a different rate and to a different temperature at each face thereof for producing a sheet of lead or lead alloy of desired characteristics under minimum power requirements.

Still another object of the invention is to provide apparatus for carrying out the method described. In carrying out this object, it is another object of the invention to provide means for measuring the depth of molten metal passing into the bight of the rolls to control this factor accurately. The said means may be either manually operated or automatic.

Further objects and advantages of the present invention will be apparent from the following description, reference being had to the accompanying drawings, wherein preferred embodiments of the present invention are clearly shown.

In the drawings:

Figs. 8, 9 and 10 are drawings of the ladle, or supply means, in various positions relative to the rolls wherein.

The fabrication of sheet stock from molten metal, by passing the molten metal into the bight between water cooled rolls, is not new in the art. Many patents have been issued wherein rolls are utilized as a means for forming molten metal into sheet stock and in these cases, the rolls act in effect as a traveling mold. In all instances, so far as we are aware, the axis of the rolls are on a horizontal plane whereby a large supply of the molten metal is held in a pocket between the rolls at all times. The present invention is directed to a new approach in the fabrication of sheet stock from molten metal and while the invention is applicable to the manufacture of many kinds of metal stock, it is obviously more easily worked when utilized in connection with non-ferrous metals due to the temperatures involved in the rolling operation. Thus brass, bronze, aluminum and alloys thereof and lead and lead alloys or other non-ferrous metals or non-ferrous alloys are more easily fabricated into sheet stock from the molten state by the method and in the apparatus disclosed herein.

In particular, the following description will be directed to lead and lead alloys but it is to be understood that with modifications, which will be apparent to any one skilled in the art, that the same method and similar apparatus may be successfully utilized for any suitable ferrous or non-ferrous metal.

Figure 1:
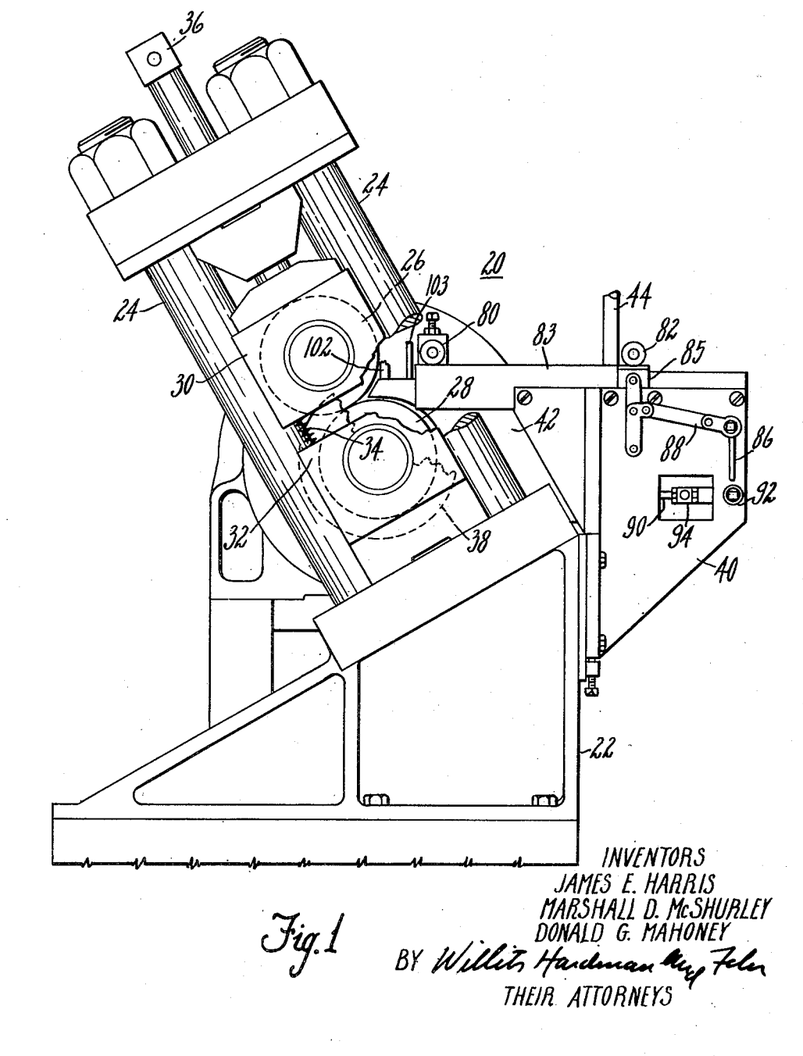
Fig. 1 is a side view of the apparatus with the rolls partly broken away to show the supply end of the ladle.

Referring to the drawings, a preferred embodiment of our improved rolling apparatus is shown at 20 in Fig. 1, wherein a base 22 supports four strain bars 24 between which are journaled rolls 26 and 28. Rolls 26 and 28 are carried by two pairs of journals 30 and 32 which are slidable on the bars 24 and which are normally held spaced apart by means of springs, one of which is shown at 34. Adjustment for the space between the rolls 26 and 28 may be made through the use of screw 36 which presses journals 30 toward roll 28, thereby compressing springs 34 and reducing the distance between the rolls to any desired distance. Roll 28 includes end flanges 38 which fit closely against the ends of roll 26. It will be noted that roll 26 and roll 28 are disposed so that their axes are in a common plane which is 30° displaced from the vertical. This particular displacement may vary according to specific applications but we have found that $30° \pm 10°$ yields the best results for reasons hereinafter explained.

Mounted on the base 22 is a carrier 40 which is used as a support for a ladle or supply means 42. This ladle or supply means is explained in more detail hereinafter.

Figure 2:
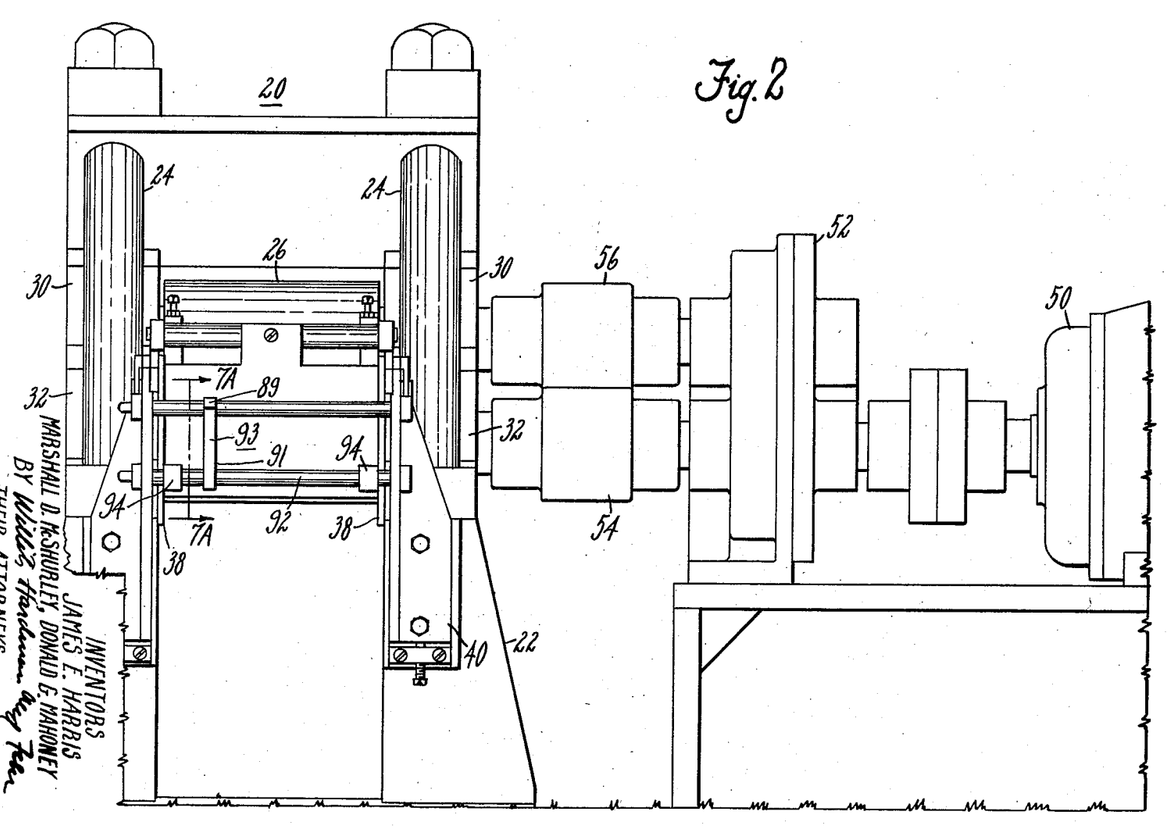
Fig. 2 is an end view of the apparatus shown in Fig. 1 together with the driving equipment utilized for motivating the rolls.

Lead or lead alloy is conveyed from a large melting pot (not shown), to the ladle 42 through a pipe 44 which is suitably heated to permit free flow of the molten metal therethrough. The rolls 26 and 28 are driven by a prime mover, preferably an electric motor, shown at 50 in Fig. 2, which operates through a speed reducer 52 and suitable connections 54 and 56 to drive the rolls at a desired speed. We have found that a motor having from five to twelve horsepower with a preferred horsepower of about ten, is suitable when the rolls are driven at a speed of about 20 R. P. M. This speed may vary from sixteen to twenty-four R. P. M. with equally good results. The apparatus, shown in Figs. 1 and 2, with particular reference to the ten horsepower utilized to drive the same, is capable of making varying sized sheets, although the sheet requiring the power input noted is one which is of approximately .065" thick and 14" wide. It is apparent that, as the thickness of the sheet is increased or decreased, the power input to the rolls will also vary and thus the necessary power input and the exact speed and temperature of the rolls is best arrived at by trial, taking into consideration, the specific metal to be cast, and the thickness of the sheet, assuming that the width thereof is constant.

Roll construction

Figure 3:
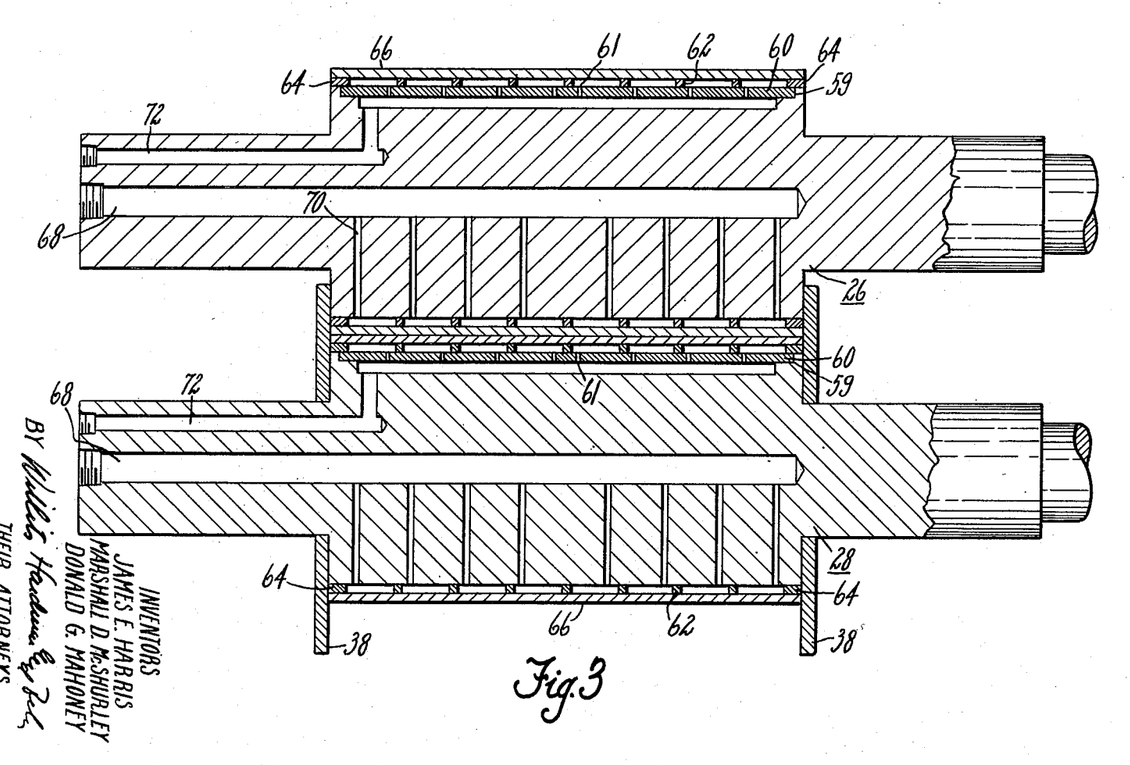
Fig. 3 is a view, in section, of the rolls used in the apparatus taken on line 3—3 of Fig. 7.
Figure 4:
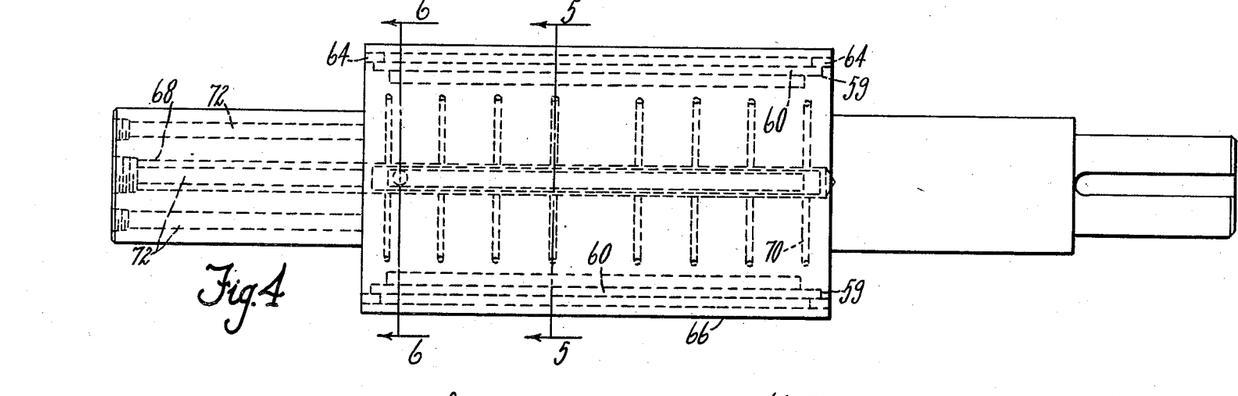
Fig. 4 is a view of one of the rolls, showing the various ducts and inner passages thereof shown in dotted lines.
Figure 5:
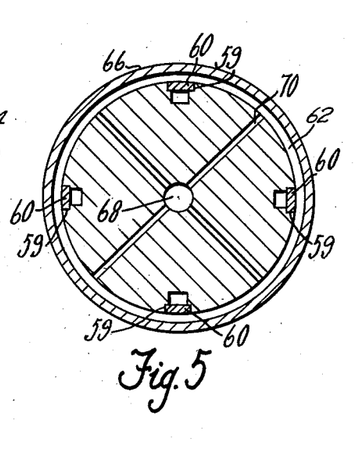
Fig. 5 is a view taken on line 5—5 of Fig. 4, showing a section of the roll.
Figure 6:
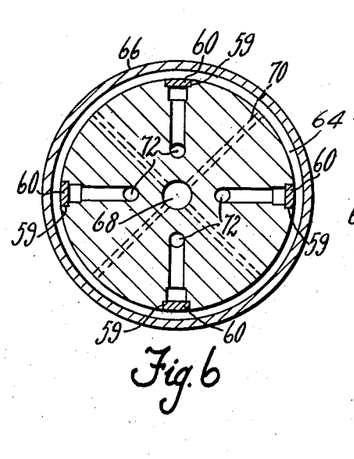
Fig. 6 is a view taken on line 6—6 of Fig. 4.

The design of the rolls 26 and 28 is of great importance to the success of this invention. These rolls are shown in detail in Figs. 3 through 7. The rolls must necessarily be cooled by a suitable fluid heat transfer medium, preferably water, and uniformity with which this cooling is carried out is of vast importance to the success of the entire operation. Referring specifically to Fig. 3, it will be noted that the rolls are made from solid metal properly machined at the external surfaces thereof and drilled in a specific manner. It will also be noted that both upper and lower rolls 26 and 28 are identical with the exception of side flanges 38 carried on the lower roll 28.

Specifically, the rolls are milled to form four longitudinal grooves 59 at the outer surface thereof. These grooves 59 permit the insertion of bars or strips 60 therein to partially close the grooves. The bars 60 are drilled as noted at 61 and also include a plurality of rings 62 welded thereto in between each of the drilled apertures 61. End rings 64 are also welded to the main metal of the roll and finally an external sleeve or outer surface 66 is put in place and welded firmly thereto. The incoming cooling medium passes through a centrally located passage 68 and is distributed to the outer surfaces of the rolls through a plurality of ducts 70 extending radially from the passage 68. These ducts 70 may be seen more clearly in Fig. 5 for example. In order to remove the cooling medium from the roll, four outlet ducts 72 are provided which connect with the outer passages of the roll through grooves 59 and apertures 61 in bars 60. It will be noted from Figs. 6 and 7, however, that the outlets for the cooling medium are displaced 45° from the inlets whereby the cooling medium flows in all directions adjacent the external surface of the roll to remove heat from metal in contact with the roll and is then drawn outwardly through the outlets 72.

The construction shown in the drawings has proven very satisfactory since the uniformity of cooling is very constant and the entire outer surface of each roll is maintained at a substantially uniform and constant temperature as determined by the temperature of the molten metal and the controlled flow of the cooling medium whereby the temperature of the roll surface may be maintained within close desired limits without hot spots or cold spots. The external surfaces of the rolls may be chrome-plated if desired which improves their resistance toward wear and aids in maintaining a clean smooth surface, the importance of which will be explained in detail hereinafter.

Ladle construction

Figure 7:
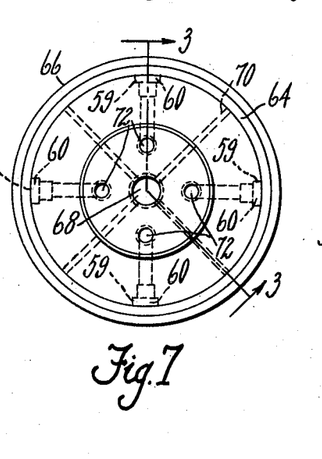
Fig. 7 is an end view of the roll with all of the ducts, etc., being shown in dotted lines.
Figures 7A, 7B, 10:
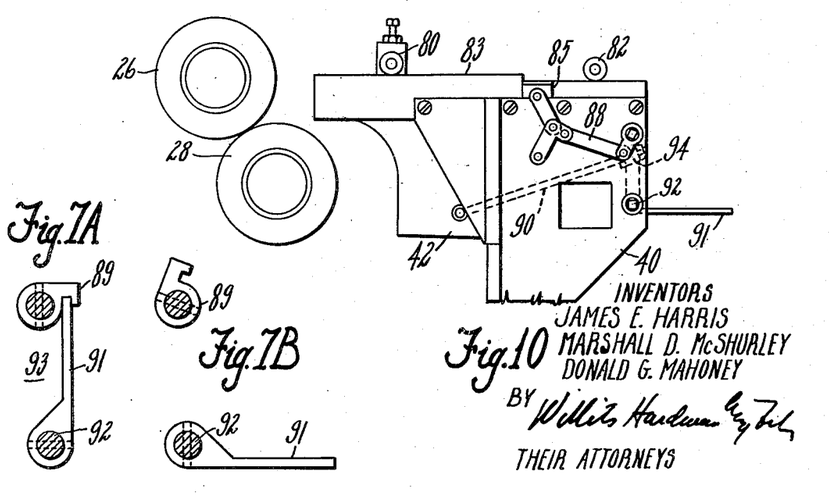
Fig. 7A is a partial view in section taken on line 7A—7A of Fig. 2 and shows the locking device for the ladle in locked position.
Fig. 7B is a view of the device shown in Fig. 7A in the unlocked position.
Fig. 10 shows the ladle backed off from the rolls.
Figure 8:
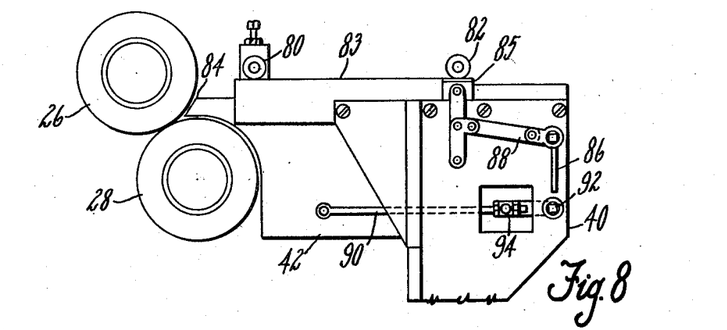
Fig. 8 shows the ladle in pouring position.
Figure 9:
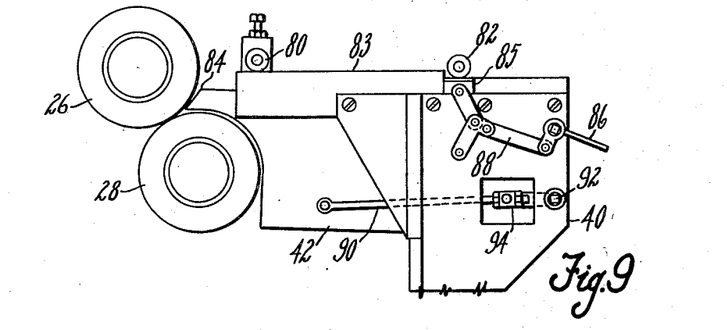
Fig. 9 shows the ladle as pouring is stopped.

The construction of the ladle and ladle carrier and the operation thereof is shown in Figs. 8 through 10. The carrier 40 is a support for the ladle 42 which is shown in detailed cross section in Fig. 12. The ladle 42 is movable on rollers 80 and 82 on track 83, similar rolls and tracks being present at the other side of the ladle. When the ladle 42 is in position ready to pour, it is carried, as shown in Fig. 8, with the outlet end 84 thereof closely adjacent to the bight of the rolls. When it is desired to stop the pouring operation, a handle 86 is turned counterclockwise as shown in Fig. 9, which breaks a toggle mechanism 88, lowering a portion 85 of the track 83 which carries the rollers 82. This tips the ladle backwardly and stops the pouring operation as shown in Fig. 9. It also removes a latch 89 of locking mechanism 93 shown in Figs. 7A and 7B from the extension 91 on rod 92. The handle 86 is then removed from toggle 88 and placed on the rod 92 and turned clockwise whereby the entire ladle 42 slides backwardly on the track 83 of the support 40 through the action of bar 90 which is attached through hinge 94 to rod 92. In this position, it is entirely away from the rolls. Only one handle 86 is provided and it will also be noted that the bar 92 cannot be turned because of the latch 89 of locking mechanism 93, until after the rear end of the ladle has been lowered or tilted as shown in Fig. 9. The single handle must then be removed and placed in the second position before the ladle can be displaced away from the rolls. This is all done as a safety measure so that a workman cannot draw the ladle rearwardly and cause the molten metal to flow out of the nose portion 84 thereof, it being necessary for the ladle to be tilted backwardly before it can be moved to the rear position.

Figure 12:
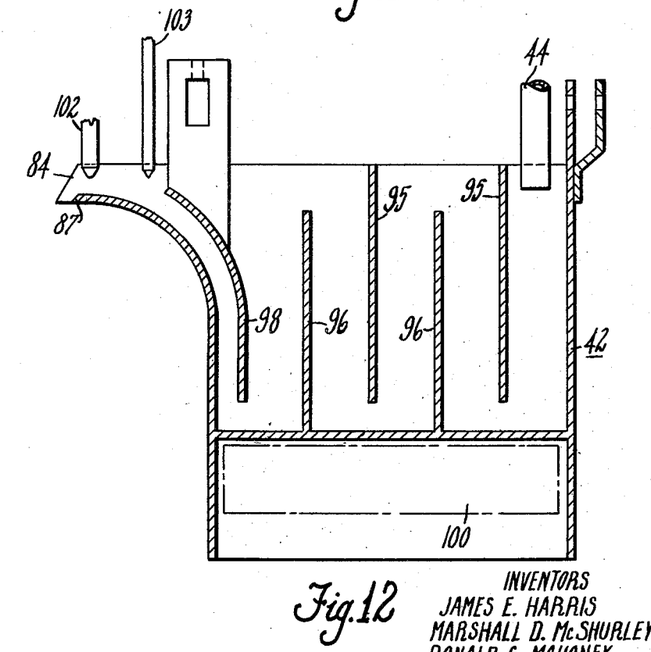
Fig. 12 is a view in cross section of the ladle or supply means.

Specific details of the ladle are shown in Fig. 12 wherein a series of upper baffles 95 are provided and a series of lower baffles 96 together with an intermediate pouring baffle 98. The molten metal which comes from pipe 44 passes over or under all of the baffles and is exhausted at the nose portion 84 from the bottom of the tank through the closed passage of baffle 98 whereby any slag or dross on the surface of the molten metal is eliminated in the pouring operation, such undesirable material remains in the ladle.

In order to keep the ladle at a predetermined temperature, heating means shown diagrammatically at 100 are provided which may be either gas burners or an electric heater. A gas burner 102 or other suitable heating means may also be provided at either side of the outlet of the ladle to heat the edges or sides of the outlet 84, thereby preventing premature freezing adjacent said edges if such condition tends to exist.

Flow control

In order to control the flow of metal to the rolls, a pointed bar 103 is provided as a gauge or measuring device to determine the depth of metal passing over or through the mouth of the ladle. The bar 103 may be visually gauged by its reflection on the surface of the metal and once it has been set it is a simple matter for the operator to maintain the desired flow of metal by adjusting valves (not shown) in supply line 44.

If it is desired to have the gauging operation automatic, it is merely necessary to insulate the bar 103 and connect it electrically with a valve which is motor or solenoid operated. In this embodiment, as the surface of the metal rises to contact the point of bar 103, a circuit is formed which closes the supply until the circuit is broken by falling off of the level of molten metal in the mouth of the ladle, when the valve is again opened, etc. This type of circuit and electrical control is well known in the art.

*Operation of device*

Much of the success of our invention is credited to the angle of pouring or flowing the molten metal which not only reduces the power input required due to the reduction of the volume of the molten metal bath at the bight of the rolls, but also produces a better sheet of material as will be explained. By having the rolls at an angle, as explained hereinbefore, the molten metal is flowed directly onto the surface of the bottom roll 28 from a horizontally disposed pool whereby it is cooled to a marked degree prior to contact with the upper roll 26. This is clearly shown in Fig. 11, wherein the molten metal 104 is shown flowing out of the outlet 84 of ladle 42. It is apparent that the molten metal 104 contacts the cooled surface of roll 28 considerably before any contact is made with the surface of roll 26. This produces a deep fast chilled surface upon which is carried both plastic metal and molten metal. After the metal passes the bight of the rolls, it is discharged as a sheet 106.

Figure 11:
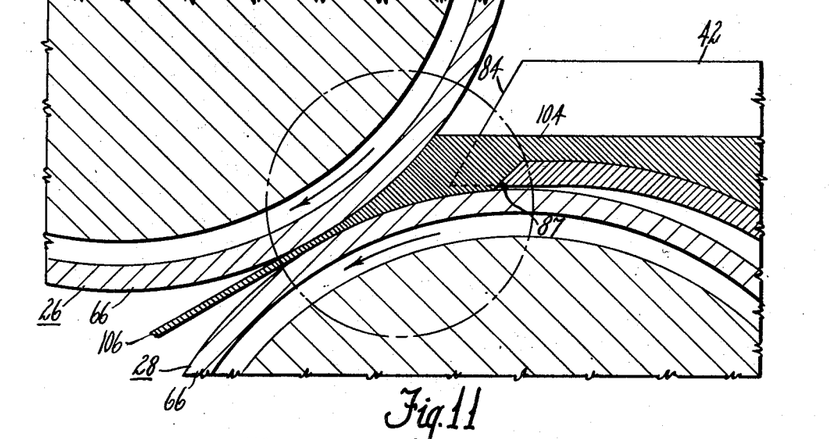
Fig. 11 is a full size fragmentary view of the rolls showing the lead or lead alloy coming from the mouth of the ladle into the bight of the rolls.
Figure 13:
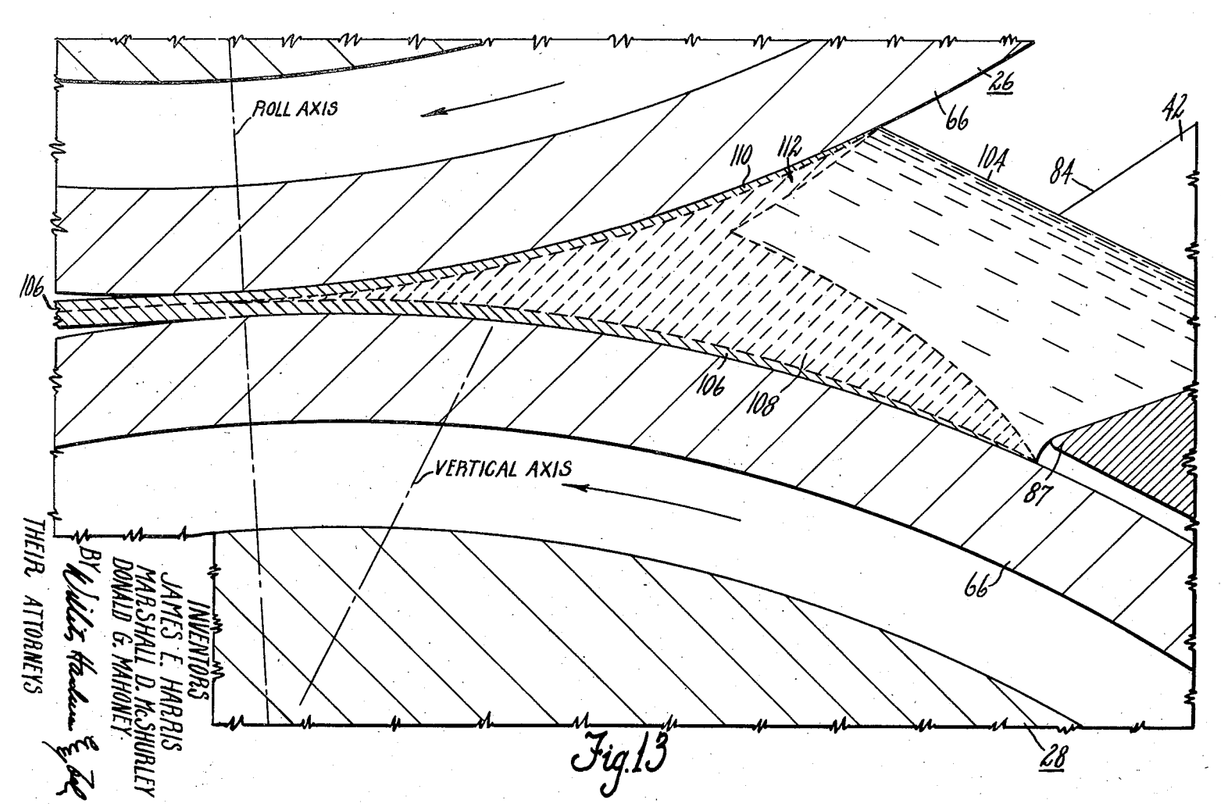
Fig. 13 is a view on a greatly enlarged scale of that portion of Fig. 11 which is encircled, showing the mechanics of freezing within the pool of metal as it approaches the bight of the rolls.
Figure 14:
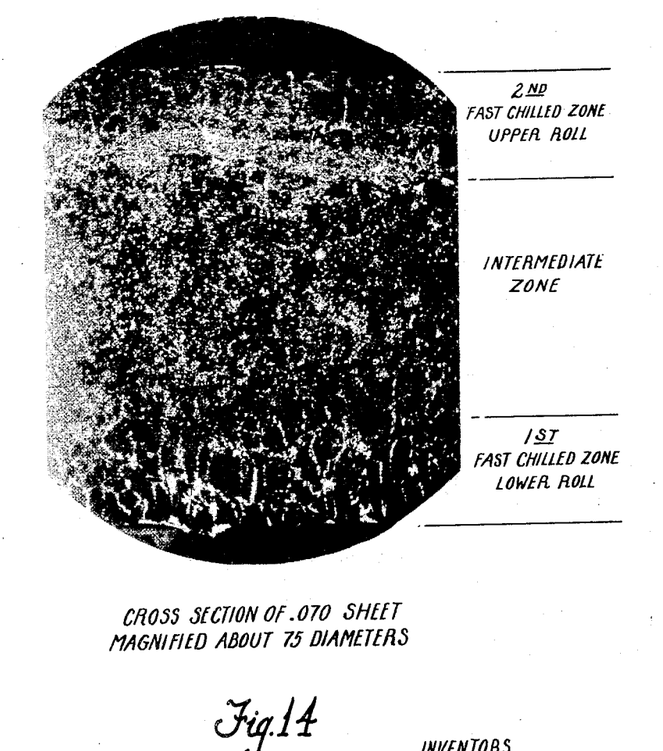
Fig. 14 is a photomicrograph on a greatly enlarged scale of cross section of the sheet material fabricated in the rolls and by the method disclosed herein.

To more clearly describe the cooling function adjacent the bight of the rolls, Fig. 13 is included which is an enlargement of the portion of Fig. 11 which is encircled. This enlargement shows the outlet 84 of the ladle 42 together with lip 87 of the outlet. The vertical axis of the rolls is noted as in the actual axis of the rolls. It will be seen that as the molten metal 104 flows off the lip 87 it immediately contacts the surface of the lower roll 28 whereupon it commences to cool and forms a deep fast chilled layer 106. Immediately above this layer, which is semi-plastic or lightly frozen, is a constantly thickening plastic layer 108 wherein the metal is of a mushy consistency, above this is molten metal. The upper layer of molten metal, upon contact with the upper roll 26, also chills at 110 and produces a second mushy layer 112. These two mushy layers come together as noted in the drawings prior to the time that the sheet, being fabricated, actually enters the bight of the rolls. This is clearly shown in Fig. 14 which is a photomicrograph of the metal. It will be seen in Fig. 14 that the lower surface shows heavy dendrites adjacent to the first fast chilled surface of the metal. Dendrites are also apparent at the upper surface although this upper surface, due to its lower temperature, does not show as deep a chill or as heavy dendrites. The intermediate layer is frozen more slowly from plastic metal 108. Thus this intermediate layer of metal is actually compressed in the mushy or plastic state as it approaches the bight of the rolls and this plastic metal is pushed backwardly and mixed into the molten metal. When the material passes the bight of the rolls, it is substantially solid throughout. It is believed that this theory is completely proven by the photomicrograph and it will be noted that the heavy dendritic structure adjacent the lower roll is not disturbed due to the thickness thereof which is occasioned by the initial deep chill of the material prior to that time the molten and plastic material contacts the upper roll. In practice, the pool of the metal maintained between the rolls, is approximately one-half inch deep since the lip 87 of the ladle 42 is one-fourth of an inch thick. Thus the molten metal 104 flowing over the lip 87 is one-fourth inch deep forming a pool on the rolls of one-half inch depth. These figures are for a sheet of approximately .065" thickness and obviously may vary as the thickness of the sheet is increased or decreased. We have found however that the full depth of molten metal 104 should be maintained so that little or no "waterfall" effect is present over the lip 87 which tends to form a rough surface on the finished sheet. The shallowness, or stated differently, the depth of the pool is one of the major factors contributing to the success of the present invention. It has been determined that this depth should be no more than fifteen times the thickness of the sheet to be formed nor should it be less than five times said thickness. This dimension is measured on a line parallel to the vertical axis of the lower roll. These limits are important since they control the power required, the surface characteristics of the sheet and the cooling effects. The same limitations will hold even when the rolls are disposed vertically one above the other although the angulation thereof permits a differential in cooling which is desirable as it forms a sheet of greater uniformity.

The method of fabricating sheet, as herein explained, is entirely different than prior art methods, wherein a deep pool of molten metal is maintained between two rolls and wherein the cooling is very rapid and shallow due to the large quantity of hot metal which is equally divided between the rolls. In the present instance, a very thin layer of molten metal is supplied horizontally to the surface of the lower roll, and into the bight of the rolls, which molten metal is selectively cooled and chilled first on the lower roll and second on the upper roll whereby the plastic material is formed adjacent the bight of the rolls and wherein this plastic metal is actually compressed just prior to its passage through the bight of the rolls causing a rolling back of the plastic metal as the layer progresses.

The thin layer of molten metal markedly reduces the power input required to turn the rolls since at no time is any great quantity of metal therebetween. In prior art devices, with uniform fast cooling on either side of the sheet, a great quantity and weight of metal is held between the rolls. This great quantity of metal holds heat which prevents a deep, fast chill and which is conducive to an actual freezing of a shallow layer on the roll surfaces. This must be mechanically removed from the rolls as they turn and requires much power for stripping.

In the present instance, the volume of molten metal is small and the pool is shallow, the chill at the surfaces of the rolls is deep and fast without hard freezing. There is never more than a very small depth of a molten plastic metal behind the rolls which reduces the power required to turn the rolls because there is very little stripping action. In this case too the present invention is a marked improvement over prior art devices and methods. Due to the shallow pool of metal on the lower roll, there is only a short length of contact between the metal and the lower roll; there is even a shorter length in contact with the upper roll. Thus there is very little metal to strip off the rolls in contrast to prior art devices where considerable length of metal contacts both rolls. In fact when fabricating an .065" sheet there is only in the order of one and three quarter inches of metal in contact with the lower roll and only about one and one-half inches in contact with the upper roll. All of this distance does not have to be stripped because of the rate of cooling but in any event, the length of metal actually stripped is maintained at an absolute minimum. Here again power is save and uniformity is improved since the action is easier with less chance of pock-marking the surface of the strip.

We have found that when working with lead, alloyed with antimony at 4%, that temperatures ranging from 625° to 650° F. in the ladle are satisfactory, wherein the cooling medium is maintained at a temperature on the outlet ranging from 100° to 140° F. In this instance, it has been found that the cooling medium coming from the upper roll is considerably cooler than that coming from the lower roll, definitely showing that the major portion of the cooling is being carried on by the lower roll. When using water with an inlet temperature of from 55° to 65°, the outlet temperatures vary from 100° to 140° with the higher temperature being that of the lower roll and the low temperature being that of the upper roll for the specific examples given herein. These temperatures may vary considerably according to the desires of the operator and are illustrative only of one embodiment. In general, we prefer to maintain the temperature of the molten metal being supplied from the ladle at about 100°±25° F. above its melting point for optimum operation although surface temperature and rotational speed of the rolls will vary this figure. In all cases, the most desirable temperature and speed of the operation is best arrived at by trial for the specific metal or alloy being sheeted.

In some instances, it may be desirable to place scrapers, not shown, against the rolls at the side opposite from the molten metal feed. These scrapers have the function of removing any sheet material which may stick to the rolls. We have found, however, that the use of these scrapers are entirely unnecessary if the surfaces of the rolls are conditioned and maintained in condition to prevent sticking. This is done by the simple expedient of honing the surfaces of the rolls periodically or by polishing the surfaces of the rolls with crocus cloth, fine metal wool or the like periodically. In other words, the surfaces of the rolls must be kept clean and bright. Finger prints and the like tend to cause sticking of the sheet metal and all extraneous material therefore should be kept off the surfaces of the rolls which should be bright at all times and which should be periodically cleaned to maintain their brightness. Polish on the rolls also effects heat transfer. The depth of chill on the lead layer appears more uniform and shallower when the rolls are bright than when dull and dirty. This depth of chill is important from a power standpoint since when too deep a chill is obtained, premature freezing is experienced which markedly increases the power required.

*Polishing device*

Since the combination of sticking and heat transfer characteristics markedly effect power requirements, it is usually desirable to have a device to maintain the rolls clean and bright.

Such a device is shown at 120 (Figs. 15 and 16) wherein one embodiment of the polishing or honing mechanism which automatically operates on the surfaces of the rolls is illustrated. The device 120 is carried by the strain bars and one of such devices 120 is preferably provided for each of the two rolls. The honing mechanism is essentially a blade 122 formed from Phosphor bronze or other relatively flexible material in thin sheet form and has a plurality of sawteeth 124 at the honing surface thereof. These teeth are merely formed by cutting the sheet at spaced intervals. The blade 122 is held between the clamping bars 126 and 128 which are carried by two mounting brackets 130 and 132 that are attached to a rod 134. The length of the honing blade 122 and its clamping bars 126 and 128 is approximately one-half inch less than the length of the roll 28 to permit movement thereof axially of the roll. To provide this movement, the rod 134 is journaled in bearings 136 and 138 carried by the strain bars so that the rod with its associated honing blade is capable of reciprocation within the bearings whereby the blade 122 is drawn across the roll 28 through a distance of about one-half inch. In order to reciprocate the device for movement in both directions, the rod 134 is threadedly attached to a piston carried within an hydraulic cylinder 140. The cylinder is of a reversing type well known in the art whereby fluid is supplied at either side of the piston through electrically controlled valves (not shown). In order to actuate the valves (not shown), a pair of micro switches 142 and 144 carried by bracket 145 are provided which are in circuit with the said valve actuating mechanism and which are controlled by a switch actuating bar 146, used to amplify movement, that contacts portions of a rod 148 extending from the end of rod 134 during movement thereof. It will be noted that the contacting abutment portions on rod 148 are adjustment nuts 150 and 152 and that said nuts with their locking members are set for approximately one-half inch clearance or whatever clearance is desired. Thus when nut 152 abuts the actuator 146, which is pivotally mounted at 154 due to right hand movement it causes the actuator 146 to move into contact with switch 144 to close the circuit to the valve (not shown) thereby introducing fluid into cylinder 140 to cause the piston to move in an opposite direction whereupon the nut 150 contacts the actuator 146 to cause closure of the circuit through switch 142 and reverse the action of cylinder 140. In this manner, the honing blade 122 is made to reciprocate across the surface of the roll through a small increment of movement whereby the surface of the roll is constantly cleaned or polished. As mentioned before, a similar device is provided for the other roll.

Figure 15:
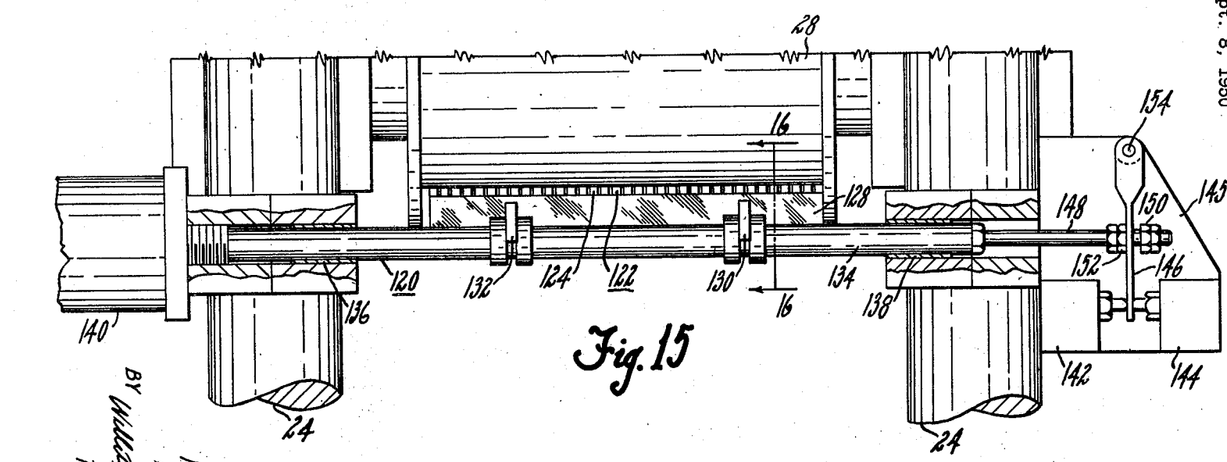
Fig. 15 is a partial fragmentary view of the lower roll showing an automatic burnishing device assembled thereto.
Figure 16:
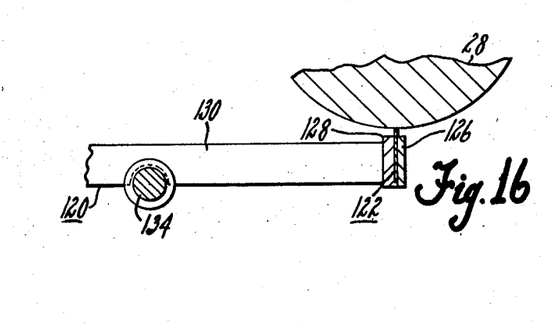
Fig. 16 is a fragmentary, sectional view taken on line 16—16 of Fig. 15.

It is apparent that the honing or polishing device of the character described is simple to construct and inexpensive to operate and that the weight of the device, due to the disposition of the rod 134, constantly urges the blade 122 into contact with the rolls. In other words, the rod 134, being rotatable in its bearings, is self-adjusting with respect to the blade whereby a constant light pressure is maintained at all times. It is apparent that other control mechanisms may be provided to cause reciprocal movement of the blade and that other types of hones, polishing or burnishing devices may be used, all coming within the scope of our invention, the device shown merely being illustrative of one embodiment of such a mechanism.

From the foregoing description, it is manifest that we have developed a novel method for forming sheet metal directly from molten metal and an apparatus for carrying out this method. The apparatus and method depart radically from prior art attempts to accomplish the same end. These departures are noted in the position of the rolls with respect to one another, whereby a very small, shallow, substantially horizontal pool of molten metal is maintained adjacent the bight of the rolls and by the predetermined and sequential cooling of first one surface of the molten metal bath and then the other surface thereof whereby a plastic mass is formed which is hot worked between the rolls prior to entry into the bight therebetween. These procedures provide a more uniform structure within metal and markedly reduce the power input to the machine.

While the embodiments of the present invention as herein disclosed, constitute preferred forms, it is to be understood that other forms might be adopted.

What is claimed is as follows:

1. In a method for fabricating sheet metal directly from molten metal, the steps comprising; supplying molten metal at a predetermined temperature to the bight of two cooled rolls set generally vertically with respect to one another wherein the axes of the rolls are in a common plane which is at least 20° and not more than 40° displaced from the vertical, in a layer having a depth of not less than 5 nor more than 15 times the thickness of the sheet to be ultimately formed, differentially cooling said metal from the lower to the upper surface wherein the lower surface is cooled faster than the upper surface whereby the metal at the lower surface is frozen at a faster rate than that at the upper surface, completely freezing the metal at the instant that it passes the bight of the rolls, and polishing the surface of said rolls during the fabrication of the sheet metal by reciprocally moving a resilient strip across the surfaces thereof in a plane at right angles to the surfaces of the rolls.

2. In a method for fabricating sheet metal directly from molten metal, the steps comprising; supplying molten metal at a predetermined temperature to a point adjacent the bight of two water cooled rolls spaced from one another a distance substantially equal to the thickness of the sheet desired and set generally vertically with respect to one another wherein the axes of the rolls are in a common plane which is at least 20° and not more than 40° displaced from the vertical, in a layer having a depth of not less than five and not more than fifteen times the thickness of the sheet to be ultimately formed, immediately freezing a layer of molten metal adjacent the surface of the lower water cooled roll for progressively cooling the molten metal above said layer to a plastic condition, subsequently freezing a layer of molten metal adjacent the surface of the upper water cooled roll for progressively cooling the molten metal below said layer to a plastic condition so that the plastic layers converge as they approach the bight of the rolls to form a dam against the flow of molten metal therethrough, then completely freezing all of the metal at the instant it passes the bight of the rolls to form a solid and finally immediately removing the solidified sheet from contact with the rolls.

3. In a method for fabricating sheet metal directly from molten metal, wherein the apparatus comprises a pair of water cooled rolls spaced from one another a distance equal to the thickness of the sheet desired and set generally vertically with respect to one another wherein the axes of the rolls are in a common plane which is at least 20° and not more than 40° displaced from the vertical, the steps comprising; flowing molten metal at a predetermined temperature from a source of supply onto the surface of the lower water cooled roll for forming a pool of molten metal between the upper and lower rolls, immediately freezing a layer of molten metal adjacent the surface of the lower water cooled roll, subsequently freezing a layer of molten metal adjacent the surface of the upper water cooled roll, simultaneously and progressively cooling the molten metal between said layers for causing said metal to become plastic for forming a dam of metal in the plastic condition extending from a point adjacent the point of supply on the lower roll to a point more closely spaced from the bight of said rolls on the upper roll, completely freezing all of the metal at the instant it passes the bight of the rolls, and then immediately removing the metal in sheet form from contact with either of said rolls.

4. In a method for fabricating sheet lead material taken from the class consisting of lead and lead antimony alloys wherein the antimony is present in quantities of not more than 12% directly from molten metal, the steps comprising; supplying molten metal at a temperature of between 600° and 700° F. to a point adjacent the bight of two water cooled rolls spaced from one another a distance between .050" and .075" and set generally vertically with respect to one another wherein the axes of the rolls are in a common plane which is in the order of 30° displaced from the vertical, immediately freezing a layer of the molten metal adjacent the surface of the lower water cooled roll, subsequently freezing a layer of the molten metal adjacent the surface of the upper water cooled roll, simultaneously and progressively cooling the molten metal between said layers for causing said cooled metal to become plastic for forming a dam of metal in a plastic condition extending from a point adjacent the point of supply on the lower roll to a point more closely spaced from the bight of the rolls on the upper roll, completely freezing the metal at the instant that it passes the bight of the rolls, and then immediately removing the metal in said form from contact with either of said rolls.

References Cited in the file of this patent

UNITED STATES PATENTS

| Number | Name | Date |
|---|---|---|
| 157,994 | Kirk | Dec. 22, 1874 |
| 1,908,825 | Drake | May 16, 1933 |
| 2,075,394 | Hazelett | Mar. 30, 1937 |
| 2,224,303 | Junghans | Dec. 10, 1940 |
| 2,332,759 | Schwarz | Oct. 26, 1943 |
| 2,345,352 | Merle | Mar. 28, 1944 |
| 2,348,178 | Merle | May 2, 1944 |
| 2,383,310 | Hazelett | Aug. 21, 1945 |
| 2,450,428 | Hazelett | Oct. 5, 1948 |

FOREIGN PATENTS

| Number | Country | Date |
|---|---|---|
| 11,317 | Great Britain | July 30, 1846 |
| 160,116 | Germany | Apr. 27, 1905 |